United States Patent [19]
Gordon et al.

[11] Patent Number: 5,432,339
[45] Date of Patent: Jul. 11, 1995

[54] APPARATUS FOR AND METHOD OF MEASURING GEOMETRIC, POSITIONAL AND KINEMATIC PARAMETERS OF A ROTATING DEVICE HAVING A PLURALITY OF INTERVAL MARKERS

[75] Inventors: Bernard M. Gordon, Magnolia, Mass.; Douglas Abraham, New Market, N.H.; David Winston, Winchester; Paul Wagoner, Cambridge, both of Mass.

[73] Assignee: Analogic Corporation, Peabody, Mass.

[21] Appl. No.: 338,263

[22] Filed: Nov. 10, 1994

Related U.S. Application Data

[63] Continuation of Ser. No. 162,653, Dec. 6, 1993, abandoned.

[51] Int. Cl.⁶ .............................................. G01D 5/34
[52] U.S. Cl. ............................ 250/231.13; 378/4
[58] Field of Search ................. 250/231.13, 231.17, 250/237 G, 560; 378/4, 9, 8, 20, 17, 19, 205, 206, 207

[56] References Cited

U.S. PATENT DOCUMENTS

| | | | |
|---|---|---|---|
| Re. 34,379 | 9/1993 | Gordon | 378/20 |
| 4,093,859 | 6/1978 | Davis et al. | 378/20 |
| 4,991,190 | 2/1991 | Mori | 378/4 |
| 5,109,397 | 4/1992 | Gordon et al. | 378/205 |

Primary Examiner—David C. Nelms
Assistant Examiner—Que T. Le
Attorney, Agent, or Firm—Lappin & Kusmer

[57] ABSTRACT

A system and method of measuring geometric, positional and kinematic parameters of a rotating device is described. The system includes a plurality of spaced interval markings distributed about the periphery of a rotatable device, such as a disk, around a circle of known radius concentric with a geometrical center of the disk. At least three and preferably four sensors for detecting the markings are positioned to sense the markings as they rotate with the rotatable device. The sensors are angularly spaced relative to one another around the disk. Means are also provided for interpolating locations between selected markers by measuring the time since each sensor senses a marker. A reference marker is provided so as to establish a reference point of the rotatable device relative to a fixed point relative to the sensors. Circuitry is provided for determining any lateral displacement of the geometric center of the rotatable device, any out-of roundness of the rotatable device if desired, the angular position of the rotatable device relative to the fixed point relative to the sensors, and the angular velocity of the rotatable device during its rotation. The apparatus has particular application to X-ray tomography systems.

44 Claims, 4 Drawing Sheets

APPARATUS FOR AND METHOD OF MEASURING GEOMETRIC, POSITIONAL AND KINEMATIC PARAMETERS OF A ROTATING DEVICE HAVING A PLURALITY OF INTERVAL MARKERS

This is a continuation of application Ser. No. 08/162,653 filed on Dec. 6, 1993, now abandoned.

FIELD OF THE INVENTION

The present invention relates generally to a measurement system and method, and more particularly to a system for and method of measuring various geometric, positional and kinematic parameters of a rotating device, such as the angular position, out of roundness, and angular speed of the rotating device, as well as any lateral displacement of the geometric center of the rotating device within the plane of rotation as the device rotates about a rotation axis.

BACKGROUND OF THE INVENTION

The present invention is intended to measure various geometric, positional and kinematic parameters with respect to and during the rotation of a rotatable device, such as a disk or drum, about a rotation axis where it is desired to assure that certain geometric, positional and kinematic anomalies in the rotation of the device are determined so that appropriate action, if any, may be taken. The present invention is particularly applicable to computerized axial tomography (CAT) scan systems and will therefore be described particularly in that context, but should not be considered to be limited to such systems.

CAT scan systems typically include a gantry formed of a structure such as a disk or drum rotatable within a frame held in a yoke. In third generation CAT scanners an X-ray source and X-ray detector array are mounted on the disk for rotational motion therewith about a table on which a patient can repose. The X-ray source and X-ray detector array are positioned about a point on the disk that defines the locus, hereinafter referred to as the "geometric center", about which the source and detector array prescribe correct rotational movement when the disk is rotated about the point during a scan so that the tomographic image can be accurately reconstructed. This geometric center ideally coincides with the nominal center of mass of the disk as well as the rotational center of the disk. In fourth generation CAT scanners the X-ray source is mounted on a rotatable disk relative to the geometric center, while the detectors are disposed on the stationary frame equiangularly about the rotation axis of the disk. In both types of systems, the X-ray source may provide periodic pulses or continuous wave radiation. Each detector typically is either a solid state or a gas tube device.

In third generation type machines the detector array is disposed diametrically opposite the source across the disk, and is aligned with the focal spot of the source so that the detector array and focal spot are positioned within a common mean, scanning or rotation plane (normal to the axis of rotation of the disk). In the case of a detector array, each detector of the array is positioned in the scanning plane, typically at a predetermined angular spacing relative to the source so that each detector subtends an equal angle relative to the focal spot, thus providing a plurality of different X-ray paths in the scanning plane between the source and the respective detectors. In third generation machines, the X-ray paths can collectively resemble a fan with the apex of the fan at the focal spot of the X-ray source. In fourth generation machines the X-ray paths with respect to each detector resembles a fan with the apex at the detector input. Accordingly, both types of machines are sometimes referred to as "fan beam" tomography systems.

These systems provide a plurality of information or data signals corresponding to variations in the radiation flux measured by the detectors at each of a plurality of projection views, i.e., at precise angular positions of the disk during rotation of the disk about an object occupying the space between the detectors and the X-ray source. Upon known (Radon) mathematical processing of the signals commonly referred to as "back projection", a visual image can be formed representing a two-dimensional slice along the plane of rotation, i.e., the scanning plane, through the portion of the scanned object positioned in the plane between the source and the detectors. The accurate formation of such images critically depends upon various factors including: (1) the movement of the disk being rotational precisely about the geometric center of the disk, (2) the geometric center remaining fixed in the scanning plane during a scan so that it does not move laterally within the plane relative to the scanned object as the disk rotates about its axis, (3) the X-ray exposure provided during each projection view being the same for each view, and (4) data being taken at precise angular positions of the disk so that data is correlated with the correct positional information of the X-ray source and/or the detectors relative to the scanned object when the image is back projected. Thus, one source of errors is due to vibrations and mechanical noise as the disk rotates within the gantry frame. Because during a scan even minor lateral movement of the geometric center of the disk of the CAT scan apparatus relative to the scanned object can cause errors resulting in faulty or erroneous images, such apparatus has been provided as massively reinforced, expensive devices often weighing a ton or more to prevent improper movement of the source and detector system.

Many of the disadvantages inherent in such a massive, expensive CAT scan structure characteristic of the prior art have been recognized and addressed, at least in part, by the apparatus described and claimed in U.S. Pat. No. 4,928,283 issued May 22, 1990 to B. M. Gordon (and U.S. Pat. No. Re. 34,379 issued Sep. 14, 1993, to B. M. Gordon) and in U.S. Pat. No. 5,109,397 issued Apr. 28, 1992 to B. M. Gordon, et al.

The former patent, U.S. Pat. No. 4,928,283 describes a lighter weight machine and some advantages it provides over the heavier machines. However, making the machine, and in particular the rotating drum, much lighter in weight creates problems for which the prior art machines were deliberately design to minimize, i.e., undesirable lateral movement and/or misalignment of the components relative to the scanned object during a scan. For example, because the X-ray source (in third and fourth generation machines) and the X-ray detector array (in third generation machines) are usually all precisely mounted relative to the geometric center of the disk, and it is assumed that the object being scanned remains fixed relative to the rotation axis during the scan, if the geometric center in the scanning plane and the center of rotation (defined as the intersection of the rotation axis and the scanning plane) are not precisely coincident, the geometric center will rotate around the center of rotation resulting in undesirable lateral movement of the components within the scanning plane relative to the scanned object during a scan. Similarly, if the center of rotation and geometric center (even if coincident) move within the scanning plane during a scan, as for example when the disk is subject to vibration, or is driven by a wheel or roller which is out of round with respect to its rotation axis, or the disk itself is out of round and driven by a wheel or roller, the components on the disk will also move laterally within the scanning plane.

The above-identified U.S. Pat. No. 5,109,397 describes, inter alia, the use of sensors that detect the proximity of the periphery of the rotating disk to the inner circular surface of a "perfect" ring disposed around the disk in the plane of rotation. The sensors then provide compensating electrical signals for modifying or correcting the data received by the x-ray detector array in accordance with deviations in the clearance between the disk and the ring. The basic rationale of this latter patent is that it is much less expensive to make the ring round within specified tolerances than to make the disk equally round. Nevertheless, the manufacture of the ring is still subject to tolerances.

In a CAT scan system, it thus is highly desirable that any lateral movement of the geometric center relative to the scanned object be kept at a very small fraction of the resolution (typically in the order of 1 mm) of the scanner, e.g. 1/10 to 1/20 of the resolution or less than about 0.1 mm. Where the disk in a scanner is typically five or six feet in diameter, the desired tolerance is then about one part in five million and is extremely difficult if not impossible to achieve. Using extreme and very expensive measures, machines have been built with machined disks and precision bearings to achieve accuracies on the order of 0.5 mm. However, this increases the cost of the machine.

In addition imaging errors can result (a) if the data is collected at incorrect angular positions of the rotating disk, which can be the result of inaccurate measurement of the actual angular position of the disk when each set of data for a projection view is taken, or (b) if the angular velocity of the disk varies throughout the scan such that the X-ray exposure for each of the projection views of the scan is not uniformly constant.

OBJECTS OF THE INVENTION

Accordingly, it is a general object of the present invention to provide a versatile system for and method of measuring anyone of the several aforementioned geometric, positional and kinematic parameters relating to a rotating device so that if necessary appropriate action can be taken. Another object of the present invention is to provide an apparatus for and a method of determining lateral movement of the geometric center within a rotation plane of a rotating device as the device rotates about a rotation axis.

And another object of the present invention is to provide an apparatus for and method of determining the angular speed of a rotating device.

Yet another object of the present invention is to provide a light weight, relatively expensive CAT scan machine having at least the accuracy of the heavier and more expensive machines of the prior art, if not better.

Still another object of the present invention is to provide an improved apparatus for and method of measuring one or more of the following parameters relating to a rotating disk in a CAT scanner so that corrective action can be made: angular position, out of roundness, and angular speed of the rotating device, as well as any lateral displacement of the geometric center within the plane of rotation as the disk rotates about an axis of rotation.

And yet another object of the present invention is to provide an improved system for and method of accurately measuring the angular position of a rotating disk of a CAT scan machine so that the precise positions of the disk for taking projection views of a scan can be accurately determined.

And still another object of the present invention is to provide an improved system for and method of accurately determining the out of roundness of a rotating disk of a CAT scanning machine so that the disk can be precisely machined to provide a disk having a precise geometric center about which the disk can rotate.

And yet another object of the present invention is to provide an improved system for and method of accurately determining the angular speed of a rotating disk of a CAT scan machine so that the disk can be servo controlled to provide more uniform exposure time for each of the projection view of a scan.

And still another object of the present invention is to provide an improved system for and method of determining whether the geometric center of a rotating disk of a CAT scan machine moves laterally within the scanning plane of the disk relative to the gantry frame (assumed to be fixed relative to the scanned object) so that positional correction data can be provided relating to the actual position of the ray paths during each projection view of a CAT scan.

And yet another object of the present invention is to provide an apparatus for and method of measuring the out-of-roundness of a rotating device such as a drum, disk or ring.

And still another object of the present invention is to provide a CAT scan apparatus and method that does not require a precision-crafted ring around the disk periphery.

Other objects of the present invention will in part be evident and will in part appear hereinafter. The invention accordingly comprises the process involving the several steps and the relation and order of one or more of such steps with respect to the others and the apparatus possessing the construction, combination of elements, and arrangement of parts exemplified in the following detailed disclosure, and the scope of the application of which will be indicated in the claims.

SUMMARY OF THE INVENTION

The present invention generally provides a versatile system for and a method of measuring one or more of various geometric, positional and kinematic parameters of a rotating device as the device rotates about a rotational axis so that appropriate action, if any, can be taken. Such parameters include the angular position, angular velocity and lateral movement of the geometric center of the device within the rotation plane relative to a fixed reference. The lateral movement of the geometric center of the device within the rotation plane relative to a fixed frame can occur as a result of the geometric center being displaced from the rotation center of the device, or the rotation center moving within the rotation plane as the device rotates. In the case of a device having a cross section in the rotation plane of a circle, such as a rotating ring, disk or drum, the parameter measured can also include the out-of-roundness of that circle.

Preferably, such a system comprises a plurality of interval markers distributed about the periphery of the device, angularly spaced from one another along a circle of known radius, preferably concentric with the geometric center of the disk. A plurality of fixed sensors for detecting the markers are provided at predetermined angular positions around and adjacent to the periphery of the device so that the sensors can detect the markers as the markers pass the sensors during rotation of the rotating device. Means are provided for measuring one or more time intervals between detection of selected ones of said markers by one or more of the sensors.

In the preferred embodiment means are also provided for determining the angular position of the rotating device at any one instant of time as a function of the markers sensed and the measured time intervals between detection of selected ones of the markers. The preferred embodiment also includes means for measuring the angular velocity of the rotating device at any one instant of time also as a function of the markers sensed and the measured time intervals between detection of selected ones of the markers. Means are also preferably provided for determining any lateral movement of the geometric center within the rotation plane relative to two or more of the sensors, and for determining out-of-roundness of the disk.

The invention employs at least three, and preferably four sensors arranged as two pairs of sensors. In the preferred embodiment the sensors of each pair are preferably, but not necessarily, positioned in quadrature, such that two lines extending through diametrically opposed sensors intersect at a measurement center, preferably but not necessarily coincident with the geometric center of the system. The markers are sensed by each sensor and the time interval between detection of successive markers is determined. Means are included for comparing measurements of the diametrically opposite sensors so as to precisely determine any lateral displacement in the rotation plane of the geometric center, as well as the out of roundness of the rotating device.

BRIEF DESCRIPTION OF THE DRAWINGS

For a fuller understanding of the nature and objects of the present invention, reference should be had to the following detailed description taken in connection with the accompanying drawings wherein.

DETAILED DESCRIPTION OF THE DRAWINGS

As hereinbefore noted, the present invention can be more advantageously described in connection with its application to the rotatable disk of a X-ray tomographic apparatus, but it will be understood to have other and wider applications.

Figure 1:
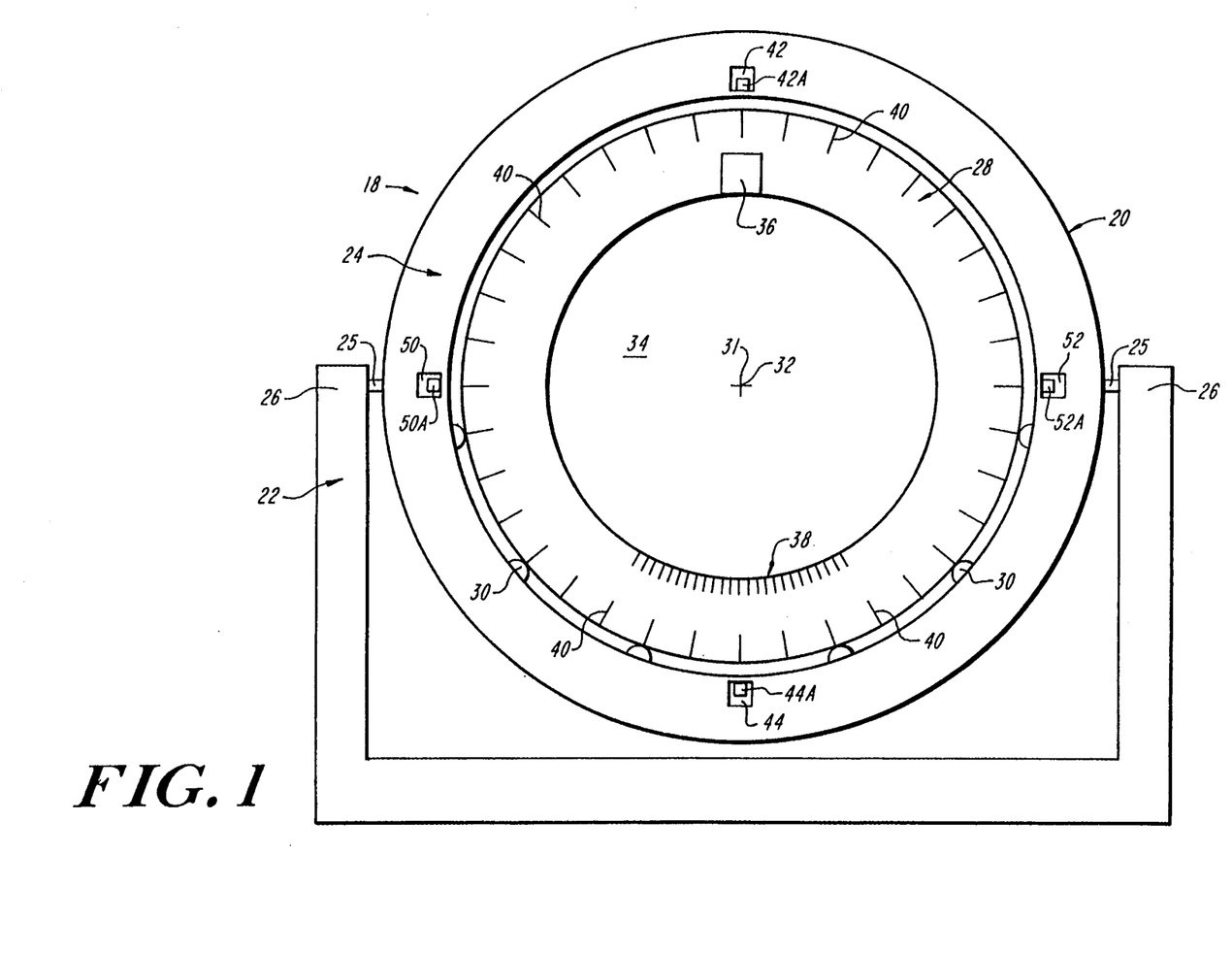
FIG. 1 is a schematic plan view of structure illustrating a CAT scan gantry constructed according to the principles of the present invention.

Referring to FIG. 1, there is schematically shown a CAT scan system 18 comprising a yoke 22 having rigid sides 26 for pivotally supporting a gantry 20 of the type used in third generation CAT scan machines and modified to incorporate the principles of the present invention. The gantry 20 includes a substantially planar, rigid frame 24, pivotally mounted about pivot pins 25 between the sides 26 of the yoke 22 and (a) typically formed as a metallic annulus or annular section and (b) preferably made of a light-weight, rigid material such as aluminum, magnesium-aluminum alloy and the like. Frame 24, at least the inner periphery of which is circular, is restrained from all movement relative to the yoke 22, except for pivotal movement about the pins 25, and is always assumed to be fixed relative to an object being scanned.

An annulus, preferably in the form of a substantially planar, annular disk 28, is rotatably mounted within frame 24, as by suitable rollers or bearings 30, for rotation within the plane of frame 24 about a rotation axis so as to define a rotation or scanning plane, further defined hereinafter. Preferably, disk 28 is made of material having substantially the same coefficient of thermal expansion as frame 24 (typically simply being the same material), and can be solid or hollow to minimize weight. The disk 28 is provided with a central aperture 34 dimensioned so that the scanned object can be inserted therethrough. The rotation center 32 of the disk 28 (defined as the intersection of the rotation axis and the scanning plane) ideally should be coincident with the geometric center 31 of the disk 28. However, as seen hereinafter, the measurement system of the present invention provides the means for determining any misalignment between the geometric center and rotation center of the disk, and, in particular, any lateral movement of the geometric center within the scanning plane during a scan, and for taking appropriate action, if necessary, when any lateral movement occurs.

X-ray source 36 is positioned on disk 28 adjacent the inner periphery defined by the central aperture 34 so as to direct a beam of X-rays from a focal spot across the aperture 34 preferably in the mean plane of disk 28 to a detector system including a detector array 38. The mean plane preferably defines the rotation or scanning plane, indicated in FIG. 3 at 39, containing the rotation center 32 and preferably the geometric center 31 (both shown in FIG. 1). The detector array 38 is mounted on disk 28 diametrically across the aperture 34 from the source 36 (and in the case of fourth generation CAT scan systems the detectors are mounted directly on frame 24) so as to detect X-rays from source 36 after the X-rays have traversed aperture 34.

Figure 2:
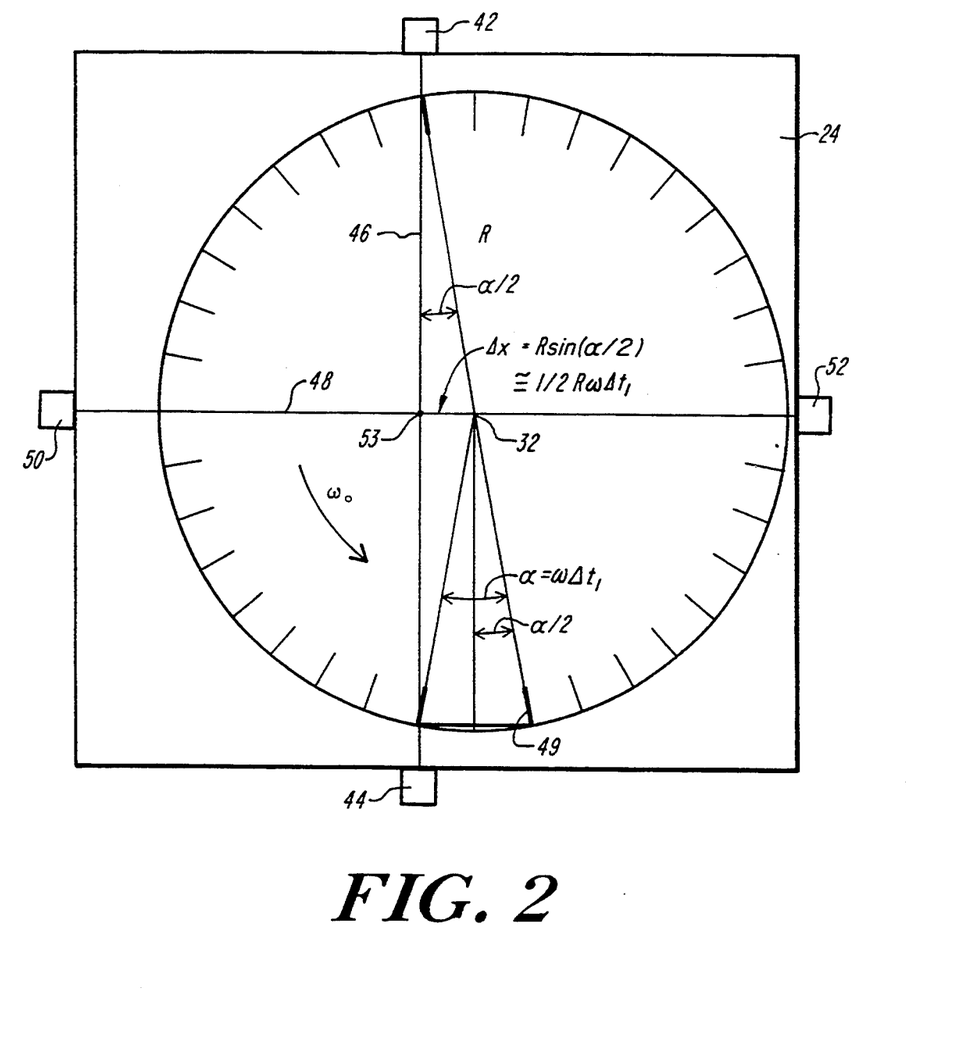
FIG. 2 is a schematic plan view of a disk of FIG. 1, overlaid with a geometrical diagram illustrating determination of the displacement of the geometric center of the disk from the measurement center.
Figure 3:
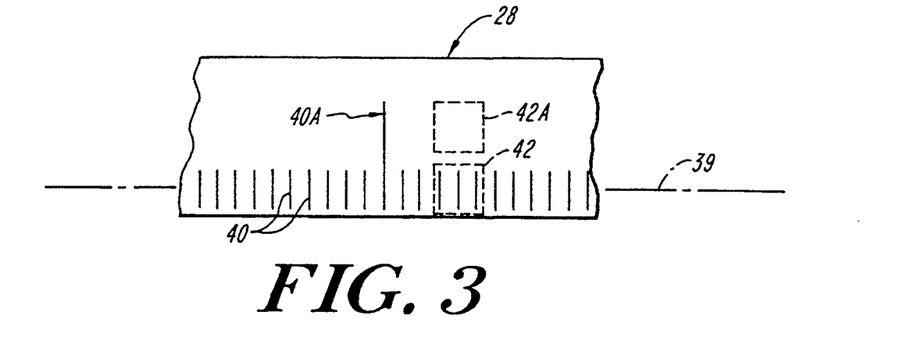
FIG. 3 is a top schematic view, partially cut away, of the disk provided with indicia in accordance with the present invention.

In accordance with the principles of the present invention, disposed on disk 28 are a plurality of interval, measurement indicia or markers 40 distributed along the outer periphery or edge 41 of the disk 28 (as best seen in FIG. 3). The markers are preferably positioned at intervals around the periphery at angular increments that are as equal as possible, although as described hereinafter, the system is adapted to cancel any measurement errors attributed to errors in marker placement so that precise marker placement is not crucial and does not impose limits on the measurements taken. The periphery 41 is preferably a circle having a known radius R, the center of curvature thereof being preferably coincident with the geometric center 31 of disk 28 as shown best in FIG. 2. Preferably, such markers 40 are equiangularly positioned around the external periphery 41 of the disk normal to and intersecting the scanning plane 39 (see FIG. 3) so that as the disk rotates about the rotation center 32 each of the markers will remain extended through the scanning plane as the markers rotate around the rotation center 32. It should be appreciated, however, the markers can also be arrayed around the outer peripheral edge of the side of the disk 28 and is shown that way in FIGS. 1 and 2 for ease of illustration. The number of markers may be varied as a function of the coarse resolution of the system as will be more apparent hereinafter. For example, in the preferred embodiment disk 28 is provided with 720 of such markers, the angular separation between each of which then represents one-half degree, but other quantities of such markers may be used, e.g. 360, 1000 or the like. As described below, the markers are detected by each of a plurality of sensors as the disk rotates about the rotation center 32. Thus, each marker 40 is made so that it can be distinguished from its background in order that the marker is detectable by each sensor. Each marker, for example, is a finely engraved, embossed, printed or otherwise suitably disposed fine line shaded, shaped, colored or in some manner made distinguishable. The markers can be disposed on the disk in any known manner, either directly or indirectly. For example, the markers can be provided on a band or similar device, which in turn is secured to the disk. Alternatively, the markers can be provided directly on the surface of the disk itself. Current machine tools can readily provide the requisite markers for disk 28 at every one-half degree within 10 seconds of the precise position for each.

In addition, for reasons which will be more apparent hereinafter, an angular position reference marker 40A is preferably provided at one angular position of the disk which establishes a reference from which the angular position of the disk 28 relative to some point fixed relative to the frame 24 can be defined. The actual position of the reference marker 40A relative to the X-ray source 36 and X-ray detector array 38 is unimportant, although the ability to define precise positions of the disk relative to a fixed point on the frame 24 is important, as will be evident hereinafter. The angular position reference marker is distinguishable from the markers 40 as the disk rotates about the rotation center 32, and can made distinguishable, for example, by being dimensioned differently, or formed so as to be detectable by a different type of detector. It can be a separate marker from markers 40, or can be one of the markers 40 made unique by creating one of the markers 40 thicker than the others, or by extending one of the markers beyond the edges of the markers 40, as shown in FIG. 3, so that it can be distinguished from all of the other markers 40 as the disk rotates about the rotation center 32.

If disk 28 is perfectly round, its support and driving mechanism are also perfectly round, the geometric center 31 and rotation center 32 of the disk 28 are perfectly coincident, and the markers 40 perfectly equiangularly spaced from one another about the exact geometric center 31 of the disk, then no problems associated with lateral movement of the geometric center of the disk during rotation of the disk about its rotation center would exist, and only one sensor, in the form of an angle encoder, would be necessary to sense markers 40 and reference marker 40A. Inasmuch such perfection is not attainable, the present invention is provided to substantially instantaneously determine such imperfections so that appropriate action, if any, can be taken. Accordingly, the measurement system of the present invention employs at least three, and preferably four sensors angularly spaced around the frame, each for detecting the measurement markers 40 as they move past each sensor for reasons which will become more apparent hereinafter.

Thus, disposed on frame 24, are preferably a first pair of primary sensors 42 and 44 and a second pair of primary sensors 50 and 52, for detecting markers 40. As shown in FIGS. 1 and 2, sensors 42 and 44 are fixed relative to the frame 24 so as to lie opposite one another on a first diameter 46 (hereinafter deemed the Y-axis) so as to define the N and S sensors, respectively, while the second pair of primary sensors 50 and 52 are positioned on frame 24 so as to lie opposite one another on a second diameter 48 (hereinafter deemed the X-axis) so as to define the W and E sensors, respectively. All of the sensors are positioned close to the path of the markers as the disk 28 rotates about the rotation center. In the preferred embodiment where the markers are disposed in the scanning plane 39, the sensors are also positioned so that all measurements are within the scanning plane 39, as partially shown in FIG. 3. The sensors are mounted on frame 24 so that diameters 46 and 48 are preferably, but not necessarily, orthogonally disposed with respect to each other and intersect at a point defining the measurement center 53. The latter preferably, but not necessarily, is positioned as closely as possible to the geometric center 31 of the disk. However, it will become more apparent hereinafter, that any errors attributed to misalignment of the two diameters so that they are not orthogonal, or the center 53 is not coincident with the geometric center 31, can be cancelled by the measurement system.

Primary sensors 42, 44, 50 and 52 are preferably any type of device for providing an electrical signal, such as a pulse or spike, when a marker 40 comes within the sensing region of the sensor as the marker moves past the sensor. For example, each sensor can be a charge-coupled device, photocell or the like with suitable optics to image each marker 40 as the latter comes into the focal region of the optics. Alternatively, markers 40 can be provided as magnetic strips or thin wires, in which case the sensors would be magnetic sensors such as Hall effect devices and the like for magnetically sensing the strips or wires. Clearly, any type of marking and sensing system can be employed.

In accordance with the preferred embodiment of the measurement system, a second set of secondary, reference sensors 42A, 44A, 50A and 52A are corresponding paired with the sensors 42, 44, 50 and 52 for detecting the reference marker 40A as it moves within the focal region of each sensor.

Figure 4:
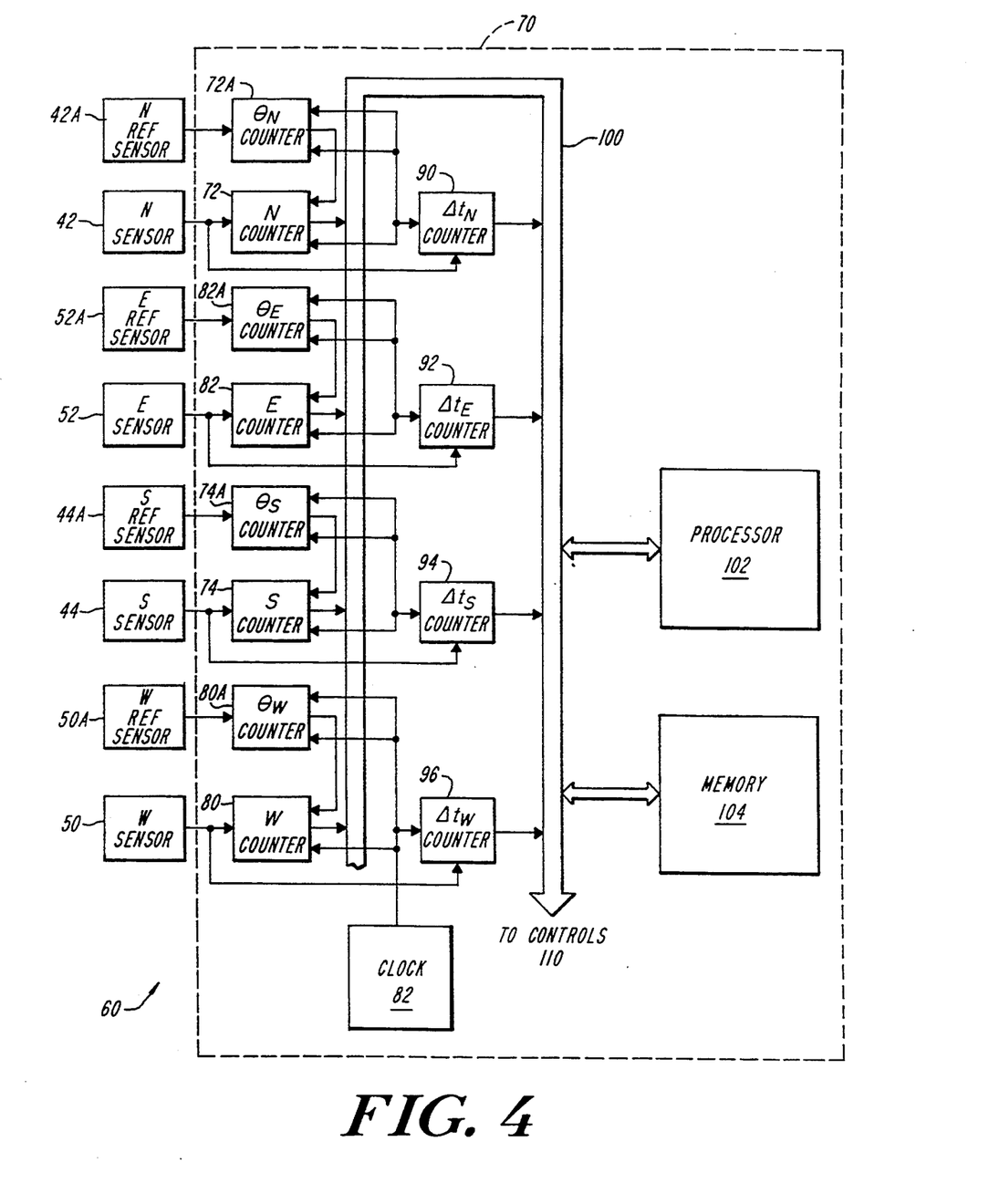
FIG. 4 is a block diagram illustrating the measurement system of the present invention.
Figure 5:
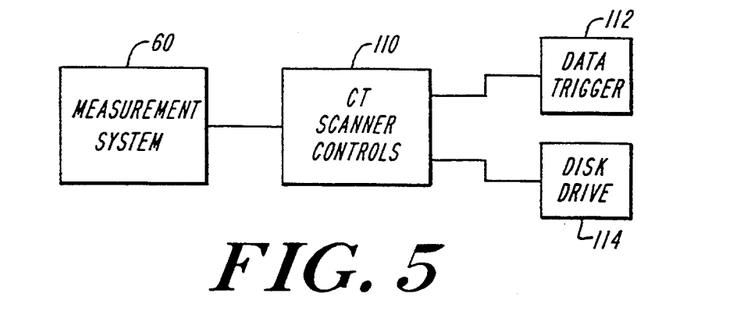
FIG. 5 is a block diagram illustrating the application of the present invention to CT Scanners.

The basic components of the preferred measurement system, generally indicated at 60 in FIGS. 4 and 5, are best seen in FIG. 4, wherein each of the sensors are connected to a suitable processor circuit 70, wherein the output of each sensor is connected to a counter, i.e. N reference sensor 42A is connected to the input of $\theta_N$ counter 72A, N primary sensor 42 is connected to the input of N counter 72, E reference sensor 52A is connected to the input of $\theta_E$ counter 82A, E primary sensor 52 is connected to the input of E counter 82, S reference sensor 44A is connected to the input of $\theta_S$ counter 74A, S primary sensor 44 is connected to the input of S counter 74, W reference sensor 50A is connected to the $\theta_W$ counter 80A, the W primary sensor 50 is connected to the W counter 80. Primary counters 72, 74, 80 and 82 each count the pulses provided by corresponding sensors 42, 44, 50, and 52; while reference counters 72A, 74A, 80A and 82A are each in the form of a one-shot multivibrator or the like, for providing an output pulse each time the reference marker 40A is sensed. The output pulses from reference counters 72A, 74A, 80A and 82A respectively reset the counters 72, 74, 80 and 82 so that each begins counting the markers 40 from the reference marker 40A. A clock 84 is provided for clocking each counter 72, 72A, 74, 74A, 80, 80A, 82 and 82A and for resetting the reference counters 72A, 74A, 80A and 82A. Four timing counters, $\Delta t_N$ counter 90, $\Delta t_S$ counter 92, $\Delta t_W$ counter 94 and $\Delta t_E$ counter 96 respectively are provided for interpolating the measured angular position of the disk 28 as sensed by each one of the corresponding sensors 42, 44, 50 and 52, when the respective sensor is positioned between two successive markers 40. The clocking rate of the clock 84 is much faster than the average rate at which markers 40 are sensed by sensors 42, 44, 50 and 52, with 1.5 MHz clocking rate and the disk rotating once every two seconds being typical.

More specifically, each timing counter 90, 92, 94 and 96 is reset by each output pulse of the corresponding sensor 42, 44, 50 and 52 so that each timing counter restarts its count each time a marker 40 is sensed by the corresponding sensor. The clock 84 provides an input to each timing counter so that the count represents the lapsed time since the corresponding sensor sensed a marker 40. The outputs of primary counters 72, 74, 80 and 82 and timing counters 90, 92, 94 and 96 are each connected to a bus 100, which in turn is connected to the processor 102 and memory 104.

The entire processor circuit 70 may be implemented in a single commercially available chip such as the Siemens SAB 80C517.

As will be described more specifically hereinafter, the measurement system of the present invention has particular utility in determining (1) any lateral displacement of the geometric center 31 from the measurement center 53 within the scanning plane at any particular moment as the disk rotates about the rotation center 32, i.e. such displacement being defined as $\Delta x$ and $\Delta y$ along the Y and X diameters 46 and 48; (2) the out-of-roundness of disk 28; (3) the angular position of the disk 28, particularly useful for controlling the triggering the reading of X-rays for each projection view of the tomography scan; and (4) the angular velocity of the disk, particularly useful for servo-controlling the speed of the disk so that X-ray exposure during each projection view of the scan is substantially the same as all of the other projection views.

(1) Lateral Displacement Measurement

The $\Delta x$ and $\Delta y$ values of the lateral displacement of the geometric center 31 from the measurement center 53 can be determined as follows:

Assuming that markers 40 are precisely angularly spaced one-half degree apart, the geometric center 31, rotation center 32 and the measurement center 53 are all coincident with one another, and the primary sensors 42, 44, 50 and 52 are all disposed precisely in quadrature relation about the measurement center 53, markers disposed 90° from one another would be sensed by the four sensors at precisely the same time. Thus, for example, with 720 markers, markers numbered 0, 180, 360, and 540 in sequence, would arrive at the corresponding sensors simultaneously with zero phase difference detected by each pair of opposing sensors 42 and 44, and 50 and 52.

Figure 6:
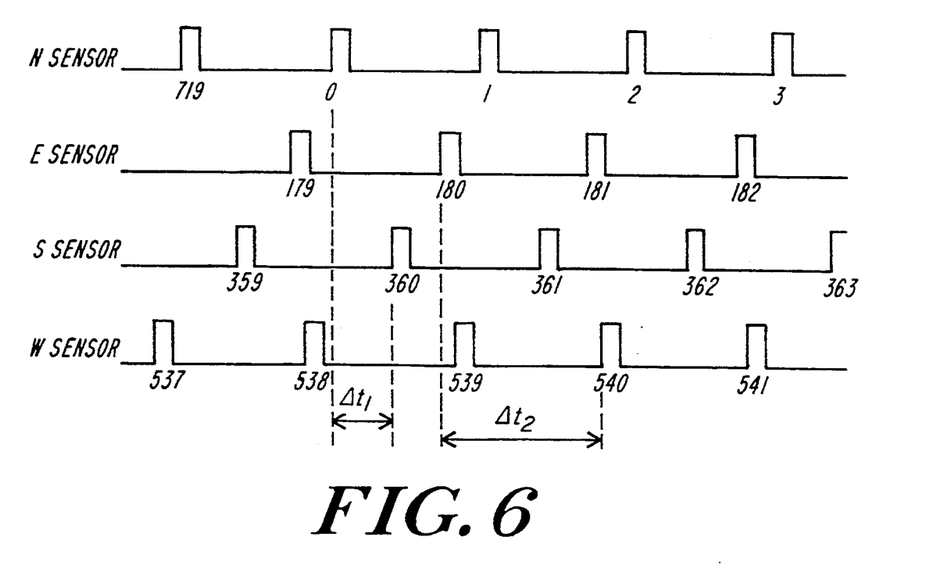
FIG. 6 is a timing diagram illustrating the phase relationship between the output signals of the sensors used to sense the interval markers.

On the other hand, as shown in FIG. 2, if, for example, disk 28 is rotating about a rotation center 32 laterally displaced within the scanning plane 39 perpendicular to Y-axis diameter 48 by an amount $\Delta x$, then two diametrically opposed markers 40 closest to common diameter 46 at a given time (e.g., markers 180 and 540 as shown in FIG. 6), will not be detected simultaneously by the N and S primary sensors 42 and 44, but instead there will be a time interval or phase difference, $\Delta t_1$ between the two detections by the sensors (seen in FIG. 6) which in the example is designated $\Delta t_{N-S}$. If the mean angular velocity, $\omega_o$, of disk 28 is known or determined, when one of the markers is sensed by N sensor 42, the marker diametrically opposed to this marker must be displaced from sensor 44 about rotation center 32 through an angle $\alpha$, as shown in FIG. 2, where:

$$\alpha = \omega_o \Delta t_1 \tag{1}$$

The actual measurement of $\Delta x$ then becomes $$\Delta x = R \sin(\alpha/2); \text{ and thus,} \tag{2}$$

$$\Delta x = R \sin(\omega_o \Delta t_1/2). \tag{3}$$

The displacement is very small so that the sine of the angle can be approximated by the angle itself, or $$\Delta x \approx R(\omega_o \Delta t_1/2); \tag{4}$$

and in the particular example, $$\Delta x \approx R(\omega_o \Delta t_{N-S}/2). \tag{5}$$

Similarly, if disk 28 is rotating such that rotation center 32 is also laterally displaced from X-axis diameter 48, then the two diametrically opposed markers 40 closest to diameter 48 will not be simultaneously detected by the W and E primary sensors 50 and 52, but instead there will be a time interval or phase difference, $\Delta t_2$, or $\Delta t_{E-W}$ between the two detectors as illustrated in FIG. 6 where the E sensor is shown as sensing the 180 marker at a different time from the time when the W sensor senses the 540 marker. Hence, those two markers must be displaced by:

$$\Delta y \approx R(\omega_o \Delta t_{E-W}/2) \tag{6}$$

Referring to FIG. 4, the value of R/2 is predetermined and stored in memory 104 for future calculations. Further, the value of $\omega_o$ is determined as described hereinafter. With these values of R/2 and $\omega_o$, the $\Delta x$ and $\Delta y$ values are easily determined at any one instant of time by measuring the phase differences $\Delta t_{N-S}$ and $\Delta t_{E-W}$. The phase differences are determined by reading the output of the N, E, S and W counters 72, 82, 74 and 80 and the timing counters 90, 92, 94 and 96 and a comparison made by the processor 102. For example, assume marker number 1 is detected by N sensor 42 approximately 65 microseconds (at 1.5 MHz clocking rate 65 microseconds is approximately ten clocking pulses) before the S sensor 44 detects the marker number 361.

When the marker number 1 is detected the N counter 72 will increase its count from zero to one, and the timing counter 90 will be cleared, while the count in the S counter 74 will remain at 360 for the next 65 microseconds or so. When the marker 361 is detected, the $\Delta t_N$ counter 90 will hold a value representative of the phase difference. It should be appreciated that the phase difference could represent a difference greater than $\frac{1}{2}°$. Thus, the calculation of phase difference necessarily also includes a comparison of the counts in counters 72 and 74 so that the phase differences between any two diametrically opposed markers is calculated by the difference in the count in the opposing counters 72 and 74 and the opposing timing counters 90 and 94.

A similar calculation for $\Delta y$ can be made using the outputs of the W counter 80 and E counter 82, and the values in $\Delta t_E$ and $\Delta t_W$ timing counters 92 and 96.

As previously described, the determination of the information regarding the deviation or displacement, $\Delta x$ and $\Delta y$, of the geometrical center 31 can be used to correct image information in a CAT scan system. For example, it is assumed that the patient is fixed relative to frame 24 (and thus measurement center 53) within which disk 28 rotates, and four primary sensors 42, 44, 50 and 52 are fixed in quadrature relative to frame 24. Displacement of the geometric center 31 which defines the position of the source and detectors should be the center of the reconstructed scan image. Thus as disk 28 rotates, and the rotational center 32 moves relative to this fixed frame of reference by $\Delta x$ and $\Delta y$ (which of course can vary as the disk rotates), the measure of this displacement at any instant of time is an indication of how much the X-ray source and detectors (and thus the X-ray paths followed by the X-rays from the source to the individual detectors) laterally move within the X–Y scanning plane 39 relative to the patient and fixed frame 24. Movement can occur because the geometric center 31 and rotation center 32 move together, as when for example the disk is rotatably driven by a wheel or roller which is out of round, or the disk itself is out of round, and/or where the geometric center and the rotation center are not coincident and thus the geometric center revolves around the rotation center as the disk rotates. This information relating to $\Delta x$ and $\Delta y$ determined for each position of the disk where a projection view is taken can then be used together with the data collected from the X-rays striking detectors 38 at the corresponding projection views to correct for the measured shift of $\Delta x$ and $\Delta y$ when the image is reconstructed, eliminating the effects of vibration and motion artifacts of disk 28 which cause displacements of $\Delta x$ and/or $\Delta y$. It will be apparent then that by insuring that the X-ray center is the same as the geometric center 31 (and that the markers 40 are spread around a circle having a center of curvature coincident with center 31, the measure of $\Delta x$ and $\Delta y$ provide a measure of offset for each projection view of a CT scan.

The measurement described above for determining the lateral displacement $\Delta x$ and $\Delta y$ permit one to measure system parameters of the measurement system itself, and as such any errors attributed to such parameters can be cancelled. For example, (a) the system can be used to measure the mispositioning of the primary sensors 42, 44, 50 and 52 and corresponding reference sensors 42A, 44A, 50A and 52A when they are not precisely in quadrature, or measurement center 53 is not precisely coincident with geometric center 31, or (b) the marker-to-marker placement is not uniform. In such cases, therefore, diameters 46 and 48 need not be perpendicular and measurement center 53 need not be coincident with the geometric center 31, nor do the placement of the markers limit the accuracy of the measurement system.

(a) Mispositioning of Sensors

While the measurement of the lateral displacement $\Delta x$ and $\Delta y$ described above assumes that the N and S sensors 42 and 44 and the E and W sensors 50 and 52 are spaced in quadrature about the measurement center 53, the system can easily accommodate mispositioning of any one or all of the sensors. In particular, one can determine the angular separation between the sensors using phase differences between diametrically opposite sensors 42 and 44 or 50 and 52 determined over a complete revolution of the disk, For example, if the geometric center 31 and rotation center 32 are coincident, but the N, E, S and W sensors are not completely in quadrature so that measurement center 53 is displaced from the geometric center and rotation center, any phase differences detected between the N and S sensors 42 and 44 and/or between the E and W sensors 50 and 52 will remain constant throughout the revolution. For example a constant phase difference detected by the N and S sensors 42 and 44, with none detected by the E and W sensors 50 and 52, indicates that the measurement center 53 is shifted along the X-axis (diameter 48 of FIG. 2) from the geometric and rotation centers. Similarly a constant phase difference detected by the E and W sensors, while none detected by the S and N sensors, indicates that the measurement center 53 is shifted along the Y-axis (diameter 46 of FIG. 2). A combination of both suggests an X-axis and Y-axis component. These constant phase values can be used to thus determine the relative positions of the four sensors, and more importantly, by determining the constant phase components in the values of $\Delta t_{N-S}$ and $\Delta t_{E-W}$ over a complete revolution of the disk 28, one can essentially eliminate these values before calculating the true values for $\Delta x$ and $\Delta y$ and thus eliminate the need to precisely align measurement center 53 with the geometric center 31 and rotation center 32 since these values are factored out of the calculations. Specifically, sinusoidal changes in $\Delta x$ and $\Delta y$ during rotation of the disk 28 (equivalent to an AC signal component) suggests lateral displacement of the geometric center 31, while a constant phase (equivalent to a DC bias component) can be subtracted from the entire phase measurements before calculating the $\Delta x$ and $\Delta y$ attributed to lateral movement of the geometric center. This DC component is actually representative of the displacement of the measurement center 53 from the geometric center and can be used to align the sensors relative to the geometric center 31. Such computations and corrections can be readily determined in the processor 102 from data collected and stored in memory 104 for an entire scan.

(b) Errors in Marker Placement

One can also determine the accuracy of marker-m-marker placement and cancel any errors attributed to errors in marker placement. For example, the time interval between detection of successive markers 40 can be provided by measurement by each of the four sensors. The time measurements provided by each of the primary sensors for each successive set of markers can then be compared and averaged to the ratio of the time of one revolution to the number of markers sensed. If the average of the $\Delta t_N$, $\Delta t_S$, $\Delta t_E$ and $\Delta t_W$ measurements for the time each respective sensor 42, 44, 50 and 52 senses marker number 2 following the time each sensor senses marker number 1 is less than the average time determined from on complete revolution, the markers are closer together than prescribed. A correction factor can then be stored in memory 104 so that when making calculations with respect to measurements between each adjacent pair of markers 40 a more accurate interpolation of angular placement between the two markers can be made. In the example of 720 markers, 720 correction factors will indicate the deviation, if any, from the $\frac{1}{2}$° spacing for each set of adjacent set of markers to indicate the extent the placement of each set of markers deviates from the $\frac{1}{2}$° spacing. Thus, if the comparison indicates an inaccuracy in marker-to-marker placement, a look-up table can be developed and stored in memory 104 to correct for such inaccuracies.

(2) OUT OF ROUNDNESS MEASUREMENT

Measurement of out-of-roundness is accomplished typically as follows: assuming that the placement of markers 40 is accurate and that disk 28 is rotating at constant speed, the measurement of $\Delta x$ and $\Delta y$ can provide out-of-roundness information. If the disk is out-of-round, and/or support roller 30 (assuming only one such roller 30 for simplicity of explanation), upon which the disk sits, is out-of-round, each will contribute a lateral displacement $\Delta x$ and/or $\Delta y$ which periodically varies with each revolution of disk 28 and roller 30, respectively. This periodicity can be measured and determined over many revolutions of each of the disk and of the roller.

Specifically, a $\Delta x$ and $\Delta y$ measurement at each marker 40 is provided from each of the counters 72, 74, 80 and 82 for one complete revolution of disk 28. During succeeding revolutions of the disk, similar values of $\Delta x$ and $\Delta y$ are averaged with the average of the preceding set of such values. A similar iterative averaging can be done for the period of roller 30. In this regard the period of disk 28 is chosen so that it is not an integral multiple of the period of roller 30 over many revolutions of the disk and roller so that one can easily distinguish between the two. The periodicity is chosen to insure that a sufficient number of revolutions of both the disk and roller occur to get an accurate picture of out-of-round rotation of each of the disk and roller before there is an overlap of the two. Plotting the spectrum of the total values of $\Delta x$ and $\Delta y$ for these multiple revolutions, there is a fundamental rate at which the disk rotates, and it can only have a spectrum which are whole integer multiples of the fundamental rate. If that fundamental rate of the roller is set so that it and its spectral components are not coincidental with those of the disk, one can determine the out-of-roundness of both the disk and roller. Even if some of the spectral components are not accurately represented, one can get a very accurate picture by taking iterative, multiple averaging of the data as described above. If roller 30 is ideally round, its harmonics will be coincident with each revolution of the roller.

The out of roundness of the disk 28 and roller 30 may be measured when making the disk and rollers to insure their roundness. However, in practice, an operational CAT scanner does not ordinarily need to make use of the out-of-round information, but there may be some implementations where it would be desirable to do so. In such an implementation, one would not need to actually look at the spectrum, but one could do the iterative averaging technique described above. As long as the disk and roller do not have the same period, useful information can be developed relating to the out-of-roundness of disk 28 and roller 30. The phase of roller 30 can be changed by allowing the roller to slip relative to the disk each revolution of the roller to prevent any overlap of the periodicity of the roller and disk. Again, all of the information can be calculated in processor 102 and stored in memory 104.

(3) ANGULAR POSITION MEASUREMENT

Measurement of the angular position of the disk is accomplished by using reference mark 40A on the disk. As disk 28 rotates, markers 40 are sensed by all four sensors 42, 44, 50 and 52, and each time a marker is sensed by a particular sensor, the disk has rotated past that sensor by an angular increment equal to the intermarker spacing, e.g. approximately $\frac{1}{2}$° corrected for each intermarker spacing measurement as mentioned above. As schematically shown in FIG. 1, and best shown in FIG. 3 a respective one of secondary sensors 42A, 44A, 50A and 52A is provided adjacent each of primary sensors 42, 44, 50 and 52 for sensing when reference mark 40A moves past each of the sensing positions of primary sensors 42, 44, 50 and 52.

As previously described with respect to FIG. 4 each of primary sensors 42, 44, 50 and 52 is connected to a corresponding one of a like plurality of counters 72, 74, 80 and 82. Each of counters 72, 74, 80 and 82 is reset to zero when the respective sensors 42A, 44A, 50A and 52A sense reference marker 40A and provide an output pulse to the corresponding secondary counters 72A, 74A, 80A and 82A. Thus, in the example of 720 markers each of counters 72, 74, 80 and 82 will provide a count of the number of markers 40 from zero to seven hundred ninemen sensed since reference mark 40A was sensed by the corresponding one of secondary sensors 42A, 44A, 50A and 52A. This count represents the position of reference mark 40A relative to the associated one of primary sensors within one-half degree and is generally represented by the following:

$$\theta = ND_c \quad (7)$$

wherein N is the count, and $D_c$ is the number of degrees per count (which in the preferred embodiment is one-half degree).

Merely measuring N and multiplying by $D_c$ will, however, provide $\theta$ with a resolution only within $D_c$. Such a resolution is too coarse for most CAT scanners, so an additional phase component $\omega_0 \Delta t$ is added so that equation (7) above expands to provide a corrected value, $\theta_c$:

$$i\theta_c = ND_c + \omega_0 \Delta t \quad (8)$$

wherein $\omega_0$ is the average angular velocity of the disk (determined in a manner described hereinafter) and $\Delta t$ is the time elapsed since the last count was entered into the counter as measured by the appropriate timing counters 90, 92, 94 and 96. It will be appreciated that some phase differences may arise between the output of sensors 42, 44, 50 and 52 relative to each other, so that the, for example 0th, 180th, 360th, and 540th counts for the four sensors do not necessarily occur simultaneously. Thus determining the angular position of the disk 28 based on the count in only one of the counters 72, 74, 80 and 82 and the corresponding timing counter 90, 92, 94 and 96 might result in a different value depending upon which set of counters is selected. Accordingly, all of the values of the four counters 72, 74, 80 and 82 and the corresponding counters 90, 92, 94 and 96 are preferably averaged to provide a more reliable value, angle $\theta_{AV}$, for the angular position of the disk. In addition, when averaging, the counts in the respective counters must be adjusted by an offset value determined by the position of the sensors 42, 44, 50 and 52, to provide the true value of the average.

More specifically, while the displacement measurement looks at the phase difference between opposite sensors 42 and 44 (N and S) or 50 and 52 (E and W), the angular position is determined by the absolute time difference from when the last detected marker 40 was sensed ($\Delta t$), as defined by equation (8).

The angle of the disk, defined by $\theta_{DISK}$ is merely the summation of all of the sensor measurements of $\theta_{DISK}$. Specifically, $$K_1 \theta_{DISK} = \theta_N + \theta_E + \theta_S + \theta_W + K_2 \tag{9}$$

wherein $K_1$ is equal to the number of sensors (4); each $\theta$ is the position measurement $\theta_c$ as determined by the count in each counter 72, 74, 80 and 82 and the corresponding timing counters 90, 92, 94 and 96 as determined by equation (8); and $K_2$ equals the offset values determined by the position of the sensors 42, 44, 50 and 52; i.e., the reference angles. For example, assuming the disk rotates counter-clockwise as shown in FIG. 2, if the N sensor 42 were used to define the 0 radian position, E sensor 52 defines the $\pi/2$ radian position (meaning the measured angle of the disk as determined by the E counter 82 and the corresponding timing counter 92 is always the measurement $\theta_c$ determined from the counters 82 and 92 less $\pi/2$ radius). Similarly, the measured angle of the disk is determined by the count in S counter 74 and corresponding timing counter 94 less $\pi$ radians, while the measured angle of the disk is determined by the W counter 80 and the corresponding timing counter 96 less $3\pi/2$ radius. Thus, the value of the offset $K_2$ in equation (9) is calculated as:

$$K_2 = -\pi/2 - \pi - 3\pi/2 = -3\pi; \text{ and} \tag{10}$$

equation (9) can be rewritten $$\theta_{DISK} = (\theta_N + \theta_E + \theta_S + \theta_W - 3\pi)/4 \tag{11}$$

Obviously, changing the number and/or position of the sensors 42, 44, 50 and 52 would change the values of $K_1$ and $K_2$.

The angle measurement can be used to accurately control the timing of the X-ray measurements to insure that the X-ray measurements are taken at each of a plurality of precise angular positions of the disk 28. Thus, as shown in FIG. 5 the measurement system 60 provides an output to the control system 110 for controlling the reading of image data as indicated at 112.

At any particular time, the angle $\theta_{DISK}$ is generally known from equation (9) and in the described arrangement, equation (11). Say at the time of detection $t_1$, the value of $\theta_{DISK}$ is $\frac{3}{4}°$ and it is desired to read data when $\theta_{DISK}$ is 1°. Thus, one can determine the value of $\Delta t$ from $$\omega_0 \Delta t = \frac{1}{4}° \tag{12}$$

where $\omega_0$ is the mean speed of the disk as measured by all of the primary sensors 42, 44, 50 and 52 as described hereinafter;

Taking into account any errors in marker-to-marker placement, the processor 102 can then instruct the control system 110 at time $t_1$ to trigger precisely at $t_1 + \Delta t$ when $\theta_{DISK}$ is exactly 1°.

One can actually measure the position at the expiration of $\Delta t$ to determine whether disk 28 is at the precise position at which one wants to be. If not, one can calculate the difference in time between the predicted position of 1° and the actual position by calculating $\theta_{DISK}$ at the time $t_1 + \Delta t$, and provide an offset for the next measurement and proceed on the same basis continually updating the value of the offset.

(4) ANGULAR VELOCITY MEASUREMENT

To use the angular velocity to servo-control the disk speed is perhaps the easiest to accomplish. The time rate of passage of markers 40 is measured to servo the speed. In this measurement, only two opposed primary detectors 42 and 44 or 50 and 52 need to be employed to measure the time it takes for two successive markers 40 to be sensed, a value indicated by $\Delta t$:

$$\omega_0 = K/\Delta t \tag{13}$$

wherein $\omega_0$ is the average velocity over time $\Delta t$, and K is a constant as a function of the intermarker spacing (any variations of which can be factored as described above).

By using opposite sensors and averaging the two values one can eliminate the effects of variations due to $\Delta x$ or $\Delta y$ so that the measurement is independent of the displacement. Thus, a displacement that varies with each revolution will not affect the measurement device, one side of disk 28 will have a varying component, $-\omega$, and the other side will have a like varying component, $+\omega$, the two of which will cancel one another.

Obviously, as seen in FIG. 5 the calculated speed can be used to servo-control the speed of the disk by continually providing updated information to the CT scanner controls 110 for controlling the speed of the disk drive 114. The measured speed is compared in processor 102 (of FIG. 4) with the desired speed stored in memory 104 and any correction is provided to the disk drive 114 through controls 110. This is important in CT Scanning since it is important to provide X-ray exposure levels as uniform as possible with each projection view. If the speed of the disk varied during a scan the exposure levels would also vary creating image date which, absent correction, when used to back project an image would provide artifacts and errors in the image.

Additional Aspects

The measurement system is thus used to determine the values of $\Delta x$, $\Delta y$, $\omega_0$ and $\theta_{DISK}$, from which, in addition to the aspects hereinbefore described one can control the particular angular position where disk 28 should be stopped. In this instance, the information relating to angular position is provided by the measurement system to the controls 110 for controlling the disk drive 114, as seen in FIG. 5. Thus, for example, it may be desirable to stop the rotation of disk 28 at predetermined locations for routine maintenance, or to take "scout" views, i.e. where source 36 and detectors 38 are at a precise angle to the patient (e.g., 90°), and an X-ray exposure is taken only at that position. The CT scanner in this instance functions simply to produce an X-ray image at the precise angle of the scout view.

Since certain changes may be made in the above apparatus and method without departing from the scope of the invention herein involved, it is intended that all matter contained in the above description or shown in the accompanying drawings shall be interpreted in an illustrative and not in a limiting sense. For example, while the use of four sensors in quadrature is desirable to provide averaging, it is neither necessary to use four sensors or to space such sensors precisely 90° apart. Three or more than four sensors can be used to perform all of the described functions, and in the case of three sensors, they are preferably but not necessarily spaced 120° apart. Changes in the number of sensors or sensor location, of course requires somewhat different mathematical calculation of the displacement of the center of rotation as a function of phase differences determined by the sensors.

Although the preferred embodiment of the invention has been described in connection with a third generation CAT scan machine, the invention can be used in other types of CAT scan machines such as fourth generation CAT scan machines, as well as other apparatus of the type including a rotating device.

What is claimed is:

1. For use with a rotatable device mounted relative to support means for rotation about a rotation axis so as to define (a) a rotation plane normal to said rotation axis and (b) a geometric center positioned within said rotation plane, an apparatus for measuring one or more positional, geometric and kinematic parameters of said rotatable device within said rotation plane as said rotatable device rotates about said axis, said apparatus comprising, in combination:

a plurality of interval markers fixed relative to said rotatable device and being distributed so as to be angularly spaced from one another along an arc of known radius of curvature substantially concentric with the geometric center;

sensing means, fixed relative to said support means, for sensing said markers at least two different angular sensing positions about said geometric center as said rotatable device rotates about said rotation axis;

interpolation means for interpolating the angular marker position between adjacent markers as sensed by said sensing means at each of said angular sensing positions, as a function of the measured time lapse since the last marker was sensed at each of said angular sensing positions; and means for measuring one or more of said parameters as a function of the sensing of said markers at each of said angular sensing positions and said measured time lapse since the last marker was sensed at each of said angular sensing positions.

2. Apparatus according to claim 1, wherein said plurality of markers are distributed substantially equiangularly around a circle substantially concentric with said geometric center.

3. Apparatus according to claim 1, wherein said sensing means includes four sensors respectively positioned at four different angular sensing positions about said geometric center.

4. Apparatus according to claim 3, wherein said four sensors are positioned substantially in quadrature with respect to one another.

5. Apparatus according to claim 1, further including means for measuring any lateral displacement of said geometric center of said rotatable device within said rotation plane as said rotatable device rotates about said rotation axis as a function of the markers sensed at each of said angular sensing positions, and the interpolated angular position between adjacent markers as sensed by each of said sensors.

6. Apparatus according to claim 5, wherein said rotatable device is of a circular cross-section in said rotation plane, said apparatus further including means for determining the out of roundness of said circular cross-section.

7. Apparatus according to claim 6, wherein said means for determining the out of roundness of said circular cross-section includes means for measuring the periodicity of the measured lateral displacement of said geometric center of said rotatable device.

8. Apparatus according to claim 1, wherein said sensing means includes four sensors positioned at said angular sensing positions substantially in quadrature, said apparatus further including means for cancelling errors attributed to the positioning of said sensors out of quadrature.

9. Apparatus according to claim 1, wherein said sensing means includes four sensors positioned and disposed at said angular sensing positions as pairs respectively on two intersecting lines in said rotation plane and intersecting at an intersection point, said apparatus further including means for cancelling errors attributed to the displacement of the intersection point from said geometric center.

10. Apparatus according to claim 1, further including (a) at least one reference marker, fixed relative to said rotatable device, and (b) angle position determination means for measuring the instantaneous angular reference marker position of said reference marker relative to a fixed reference point on said support means as a function of the number of markers sensed at each of said angular sensing positions since the reference mark is sensed each of the corresponding angular sensing positions, and the corresponding interpolated angular reference marker position as sensed by the corresponding interpolation means.

11. Apparatus according to claim 10, further including means for averaging the instantaneous values of the angular reference marker position of said device measured at said angular sensing positions.

12. Apparatus according to claim 1, wherein said markers are substantially equiangularly spaced about said geometric center, said apparatus further includes means for determining the accuracy of marker-to-marker placement as a function of the average time lapse between the sensing of adjacent markers at said angular sensing positions so as to compensate for non-uniform equiangular spacings between adjacent markers.

13. Apparatus according to claim 1, further including means for measuring the angular velocity of said device as said device rotates about the said axis as a function of the average time rate of passage of said markers through said angular sensing positions.

14. Apparatus according to claim 1, wherein said sensing means includes at least two sensors.

15. Apparatus according to claim 1, wherein said sensing means includes at least three sensors.

16. For use with a rotatable device mounted relative to support means for rotation about a rotation axis so as to define (a) a rotation plane normal to said rotation axis and (b) a geometric center positioned within said rotation plane, an apparatus for measuring any lateral displacement of said geometric center of said rotatable device within said rotation plane as said rotatable device rotates about said axis, said apparatus comprising, in combination:

a plurality of interval markers fixed relative to said rotatable device and being distributed so as to be angularly spaced from one another along an arc of known radius of curvature substantially concentric with the geometric center;

angle determination means including (a) at least two sensors, fixed relative to said support means at two different angular positions about said geometric center, for sensing said markers as said rotatable device rotates about said rotation axis, and (b) means for determining the relative angle between said sensors as a function of the markers sensed by said sensors so that said lateral displacement of said geometric center is a function of variations in said relative angle as determined by said angle determination means as said rotatable device rotates about said rotation axis.

17. Apparatus according to claim 16, further including interpolation means for interpolating the angular position between adjacent ones of said markers as sensed by each of said sensors as a function of the measured time lapse since the last marker was sensed by each of said sensor.

18. Apparatus according to claim 11, wherein said angular determination means further includes means for measuring any lateral displacement of said geometric center of said rotatable device within said rotation plane as said rotatable device rotates about said rotation axis as a function of the markers sensed by each of said sensors, and the interpolated angular position between adjacent markers as sensed by each of said sensors.

19. Apparatus according to claim 18, wherein said rotatable device is of a circular cross section in said rotation plane, said apparatus further including means for determining the out of roundness of said circular cross-section.

20. Apparatus according to claim 19, wherein said means for determining the out of roundness of said circular cross-section includes means for measuring the periodicity of the measured lateral displacement of said geometric center of said rotatable device.

21. Apparatus according to claim 16, wherein said apparatus includes four sensors positioned substantially in quadrature, said apparatus further including means for cancelling any errors attributed to the positioning of said sensors out of quadrature.

22. Apparatus according to claim 16, wherein said apparatus includes four sensors positioned and disposed as pairs respectively on two intersecting lines in said rotation plane and intersecting at an intersection point, said apparatus further including means for cancelling errors attributed to the displacement of the intersection point from said geometric center.

23. Apparatus according to claim 16, wherein said markers are substantially equiangularly spaced about said geometric center, said apparatus further includes means for determining the accuracy of marker-to-marker placement as a function of the average time lapse between the sensing of adjacent markers by said sensors so as to compensate for non-uniform equiangular spacings between adjacent markers.

24. For use with a rotatable device mounted relative to support means for rotation about a rotation axis so as to define (a) a rotation plane normal to said rotation axis and (b) a geometric center within said rotation plane, an apparatus for measuring substantially the instantaneous angular position of said device relative to a fixed reference point of said device as said rotatable device rotates about said axis, said apparatus comprising, in combination:

a plurality of interval markers fixed relative to said rotatable device and being distributed so as to be angularly spaced from one another along an arc of known radius of curvature concentric with the geometric center;

at least one reference marker, fixed relative to said rotatable device, for defining said reference point from which the angle of said rotatable device can be measured;

angle position determination means including (a) marker sensing means, fixed relative to said support means at a predetermined angular position about said geometric center, for sensing said reference marker and for sequentially sensing said interval markers as said rotatable device rotates about said rotation axis, and (b) means for determining the time lapse since the last marker was sensed by said marker sensing means; and means for determining the angular position of said rotating device as a function of the number of markers sensed by said sensing means since said reference marker is sensed by said sensing means and said time lapse.

25. Apparatus according to claim 24, wherein said angle sensing means includes at least two sensors, fixed relative to said support means at two different angular positions about said geometric center, for sensing the markers as said rotatable device rotates about said rotation axis so as to provide two measurements of said angular position; and means for averaging the instantaneous values of said two measurements.

26. Apparatus according to claim 25, wherein said sensors are fixed at substantially diametrically opposite positions of said rotatable device.

27. For use with a rotatable device mounted relative to support means for rotation about a rotation axis so as to define (a) a rotation plane normal to said rotation axis and (b) a geometric center within said rotation plane, an apparatus for measuring substantially the instantaneous angular velocity of said device as said rotatable device rotates about said axis, said apparatus comprising, in combination:

a plurality of interval markers fixed relative to said rotatable device and being distributed so as to be angularly spaced from one another along an arc of known radius of curvature concentric with the geometric center;

angular velocity determination means including (a) at least two sensors, fixed relative to said support means at two different angular positions about said geometric center, for sensing said markers as said rotatable device rotates about said rotation axis, (b) means for measuring the time required to sense successive markers by said sensors as said rotatable device rotates about said rotation axis, and (c) means for determining the angular velocity of said rotatable device as a function of the average time it takes for said sensors to sense successive markers.

28. Apparatus, including a rotatable object mounted in support means for rotation about a rotational axis, said apparatus comprising, in combination:

a plurality of interval markers distributed on said rotatable object and being angularly spaced from one another along an arc of known radius of curvature substantially concentric with a geometrical center of said object;

at least three primary sensors for detecting said markers and positioned on said support means so as to lie at predetermined angles relative to one another about said geometric center wherein the angular spacing between at least two of the sensors is defined by a first predetermined angle;

means for determining the angular velocity of said disk during rotation thereof in accordance with the response to detection by at least one of said primary sensors of successive ones of said markers;

means for measuring any time interval between detection of markers spaced approximately by said first predetermined angle by each of said two sensors; and means for determining lateral movement of the geometric center of said disk as a function of said angular velocity and said time interval.

29. Apparatus as defined in claim 28, wherein said apparatus includes four sensors positioned substantially in quadrature about said geometric center, and said plurality of markers are distributed in pairs of markers, each said pair being positioned substantially diametrically opposite one another relative to the geometric center.

30. Apparatus as defined in claim 29, further including means for measuring any time interval between detection of diametrically opposite ones of said markers by diametrically opposite ones of said sensors; and means for determining lateral displacement of said geometric center relative to said sensors as a function of the radius of curvature of said arc, said angular velocity and the time interval between detection of diametrically opposite ones of said markers by said primary sensors.

31. Apparatus as defined in claim 28, wherein said plurality of interval markers is an even number and said markers are distributed at substantially equal angular increments about said geometric center along the entire periphery of said disk.

32. Apparatus as defined in claim 28, wherein said sensors are adapted to optically detect said interval markers as the latter are rotated past said sensors.

33. Apparatus as defined in claim 28, wherein said markers are magnetic strips and said sensors are adapted to detect the magnetic fields of said interval markers as the latter are rotated past said sensors.

34. Apparatus as defined in claim 28, wherein one of said markers is a reference marker and the angles between adjacent ones of the others of said markers are known, and said apparatus includes:

means for counting, commencing from said reference marker, the number of said other markers as detected by at least one of said sensors; and means for determining the angular position of the reference mark relative to a fixed reference point as a function of said number and said angles between the adjacent ones of the others of said markers.

35. Apparatus as defined in claim 34, further including means for measuring the elapsed time since the detection of the last marker of said number of said other markers as detected by at least one of said sensors;

means for determining an angular increment as a function of said elapsed time and said angular velocity and for adding said angular increment to said angular position.

36. Apparatus as defined in claim 28, wherein at least one of said markers is a reference mark and the angles between the others of said markers are known, said apparatus further comprising:

at least four of said sensors for detecting said markers and positioned on said support means so as to lie substantially in quadrature;

at least four counters, respectively coupled to the sensors, for counting, commencing from said reference mark, the number of said other markers as detected by the respective ones of said sensors; and means for determining the angular position of said disk relative to said reference mark as a function of said number count in each of said counters.

37. Apparatus as defined in claim 36, further including means for averaging the angular position as determined by said sensors.

38. Apparatus as defined in claim 37, wherein each of said counters has a preset offset count stored therein to adjust the count in each of said counters in accordance with the position of said each of said sensors relative to the others of said sensors; said apparatus further comprising reference mark sensing means, positioned adjacent each of said sensors, for detecting the positioning of said reference mark;

means for resetting each of said counters to an adjusted zero on detection of said reference mark by the corresponding reference mark sensing means.

39. In an improved X-ray tomography system comprising an X-ray source and X-ray detection means; support means; annular means, including a geometric center, for supporting at least said X-ray source for rotation within a scanning plane about a rotation axis; the improvement comprising:

a plurality of interval markers distributed on said annular means and being angularly spaced from one another along an arc of known radius of curvature substantially concentric with said geometric center;

at least three sensors for detecting said markers and fixed relative to said support means so as to lie at predetermined angles about a measurement center;

means for determining the angular velocity of said annular means during rotation thereof in accordance with the response to detection by at least one of said sensors of successive ones of said markers;

means for measuring any time interval between detection of markers by at least one of said sensors; and means for determining lateral movement of said geometric center relative to said measurement center as a function of the radius of curvature of said arc, said angular velocity and said time interval.

40. An improved X-ray tomography system as defined in claim 39, further including means for determining the angular position of said annular means so as to provide information for triggering each projection view of a tomographic scan.

41. An improved X-ray tomography system as defined in claim 40, including means, responsive to said means for determining the angular velocity of said annular means, for controlling the rotation of said annular means so that the X-ray exposure during each projection view of said tomographic scan is substantially the same.

42. An improved X-ray tomography system as defined in claim 40, wherein said apparatus includes four of said sensors.

43. An improved X-ray tomography system as defined in claim 42, wherein said four sensors are positioned substantially in quadrature with respect to one another.

44. A method of determining parameters associated with movement of a circular disc mounted in support means for rotation in a rotation plane about a rotational axis, said method comprising the steps of distributing a plurality of interval markers on said disk so that said markers are angularly spaced from one another along an arc of known radius of curvature concentric with a geometrical center of said disk;

detecting said markers, during rotation of said disk, with at least three sensors fixed relative to said support means so as to lie at predetermined angles about a measurement center;

determining the angular velocity of said disk during rotation thereof in accordance with the response to detection by at least one of said sensors of successive ones of said markers during rotation of said disk;

measuring any time interval between detection of at two of said markers by at least two of said sensors; and determining lateral movement of said disk within said rotation plane, as said disk rotates about said rotation axis, as a function of the radius of curvature of said arc, said angular velocity and said time interval.

* * * * *